May 23, 1944.　　　　G. B. COE　　　2,349,246
MANUFACTURE OF TAPERED STOCK
Filed Aug. 7, 1942　　　5 Sheets-Sheet 1

INVENTOR
George B. Coe
BY Emery, Varney, Whittemore & Hay
ATTORNEYS

May 23, 1944.　　　　G. B. COE　　　　2,349,246
MANUFACTURE OF TAPERED STOCK
Filed Aug. 7, 1942　　　　5 Sheets-Sheet 5

INVENTOR
George B. Coe
BY
Emery, Varney, Whittemore
ATTORNEYS

Patented May 23, 1944

2,349,246

UNITED STATES PATENT OFFICE 2,349,246

MANUFACTURE OF TAPERED STOCK

George B. Coe, Upper Montclair, N. J., assignor to Rockrite Processes, Inc., Stamford, Conn., a corporation of Delaware Application August 7, 1942, Serial No. 453,928

6 Claims. (Cl. 80—62)

This invention relates to the manufacture of tapered stock, particularly tubes, from cylindrical stock, and has for an object the provision of improvements in this art.

A problem with which the present invention is concerned is that of making a long or large tapered tube of predetermined shape, preferably while preserving the polished interior and exterior surfaces of the original stock or workpiece. If a short or small tapered tube is to be made, this may be done, for example, by the method and machine described in the patent to George E. Neuberth, Number 1,810,885, dated June 16, 1931. According to that patent, a tube is reduced in short increments, beginning at one end, by a set of gapped die rolls or rockers. When the tube or workpiece is worked cold its bright finish will be preserved or improved, this being a characteristic of the so-called "Neuberth process." But it is not practicable to make very large or long tapered tubes in the manner disclosed in that patent, owing to the large size of the dies which would be required.

The present invention provides a modification of the said Neuberth process whereby it is practicable to make tapered tubes of any size or length desired.

The invention will be explained by reference to the accompanying drawings, wherein.

Figure 5:
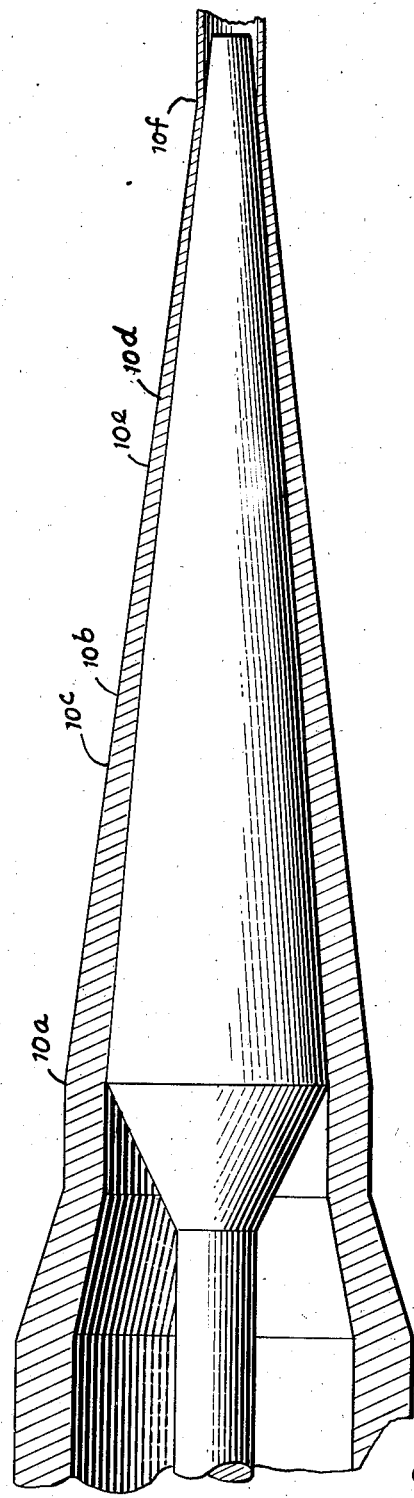
Fig. 5 is a view of the completed tapered tube showing its dimensions in companion with those of the original mandrel.

For tubes of different length the number of die or rocker sets may be varied. Herein three sets are shown to illustrate the principles of the invention. The initial stock or workpiece (Fig. 1) may be 40½" long, 29" in the straight or cylindrical portion beyond the taper, and 11½" from the lower end of the taper to the butt end. The external diameter of the straight portion may be 5.896", and the internal diameter may be 5.092". The wall thickness is 0.402". The dimensions of the butt end are not important here because this part is not reduced and also because part of the butt end is later cut off. The initial workpiece is accurately machined and polished both inside and outside. All scale and other particles are carefully eliminated. The finished tube (Fig. 5) in the part which is tapered by the present method may be about 58" long and have a wall thickness varying from 0.070" at the small end to 0.402" at the large end. The taper, both outside and inside, may be either constant or variable. In the example selected herein the outside taper is constant, 0.0335" per inch, and the inside taper varies from 0.020" per inch at the butt end to 0.026" per inch at the small end. These dimensions are all given as an example and are not limiting.

The initial tube or workpiece 10 is placed on a tapered mandrel 11 and reduced by the first set of gapped dies which have their tapered portion disposed in a longitudinally fixed position with reference to the tapered portion of the mandrel. The dies may rock back and forth on the tube; or the tube may be moved back and forth in the dies which oscillate about fixed pivots; or both dies and tube may move back and forth; or the dies may rotate while the tube reciprocates. These are all known types of mills which have the same general type of reducing action. They are referred to broadly as step-by-step or pilger mills, though the last named type is more specifically referred to as a pilger mill. For simplicity it will here be assumed that the die axes reciprocate to cause them to rock back and forth on the stock.

Figure 1:
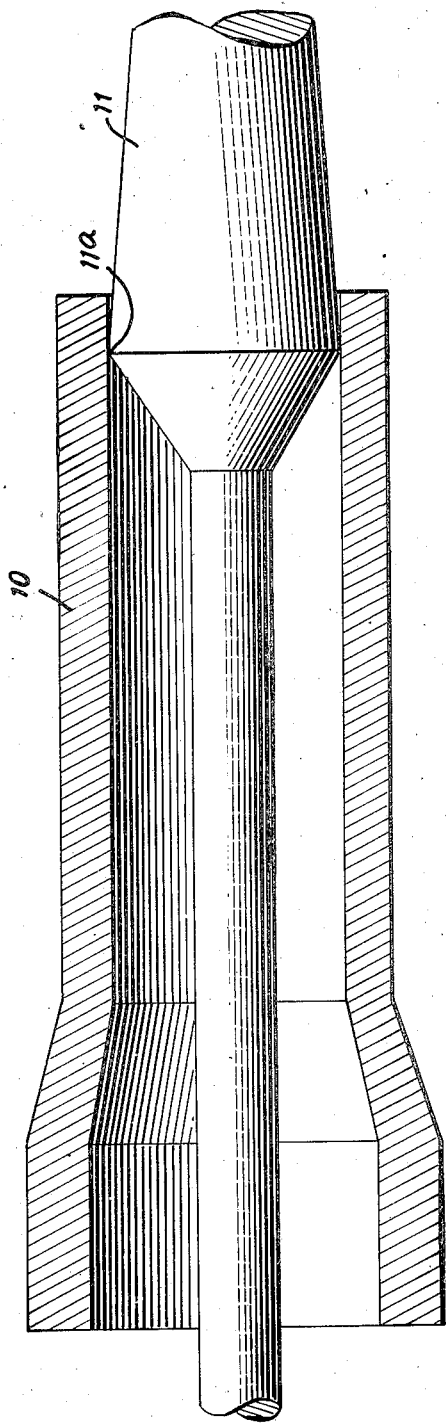
Fig. 1 is a diagram showing the starting stock, that is, the original workpiece (in the present case a cylindrical tube) in the position it occupies upon a mandrel at the start of the reducing operations.

At the beginning of operations the tube 10 is positioned so that its forward end extends just over the large end 11a of the mandrel as shown in Fig. 1, and after each die cycle or reducing action the tube is fed forward by a small increment of length along the mandrel. Between actions it is also rotated to keep it smooth and round. In this way, the tube will be reduced in successive short increments of length, beginning at its forward end, by rolling it step by step down the taper of the mandrel toward that end, that is, toward the end at which the reduction is begun; and since during each die cycle the tube is given a short increment of feed through the dies in a forward direction, the reduction of the tube, or "working," proceeds gradually in the reverse direction or backward, that is, from the forward toward the rear end of the tube.

Figure 2:
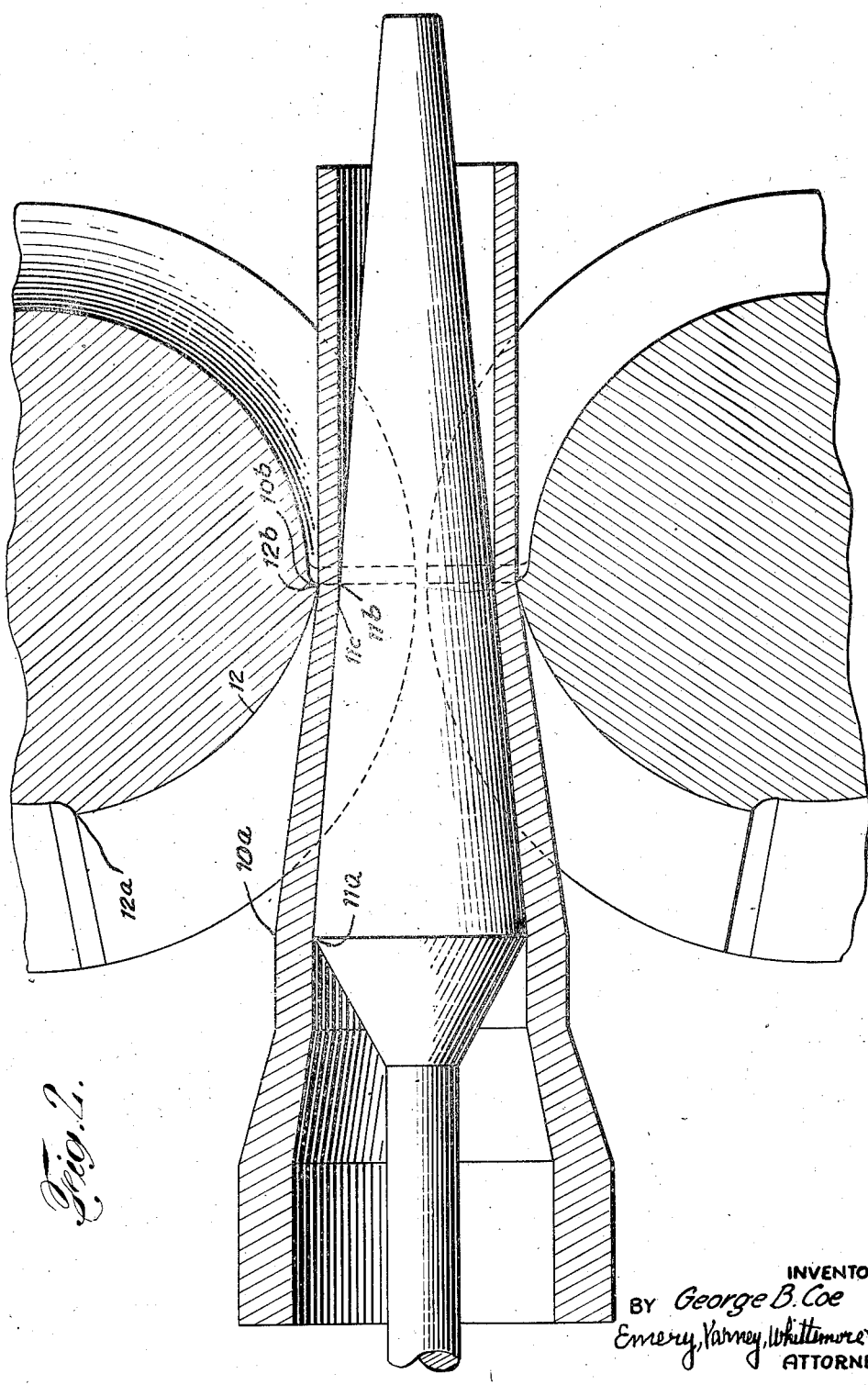
Fig. 2 is a similar diagram showing the starting stock after the action of the first set of dies has been completed.
Figure 3:
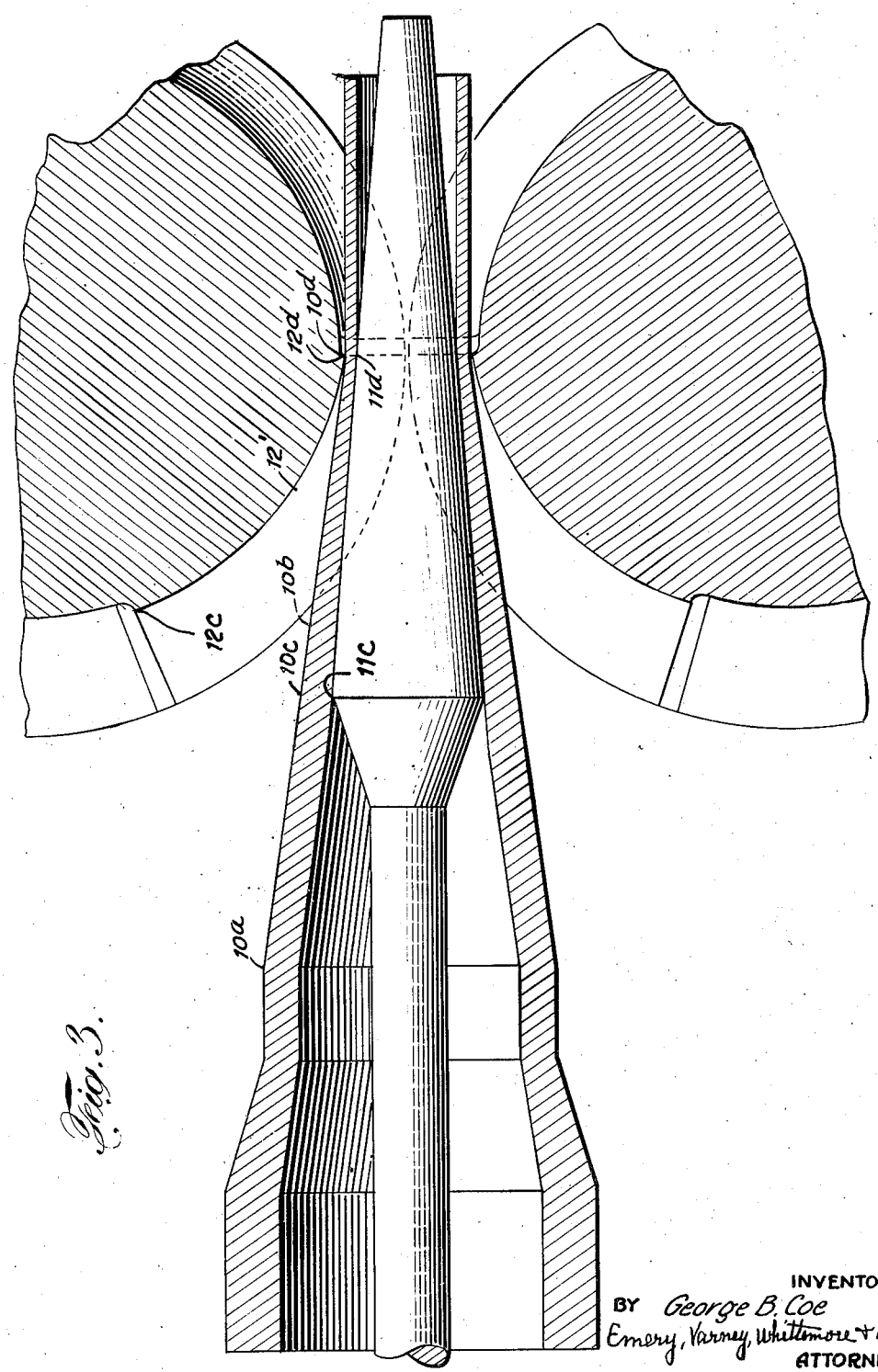
Fig. 3 is a similar diagram showing the starting stock after the action of the second set of dies has been completed.
Figure 4:
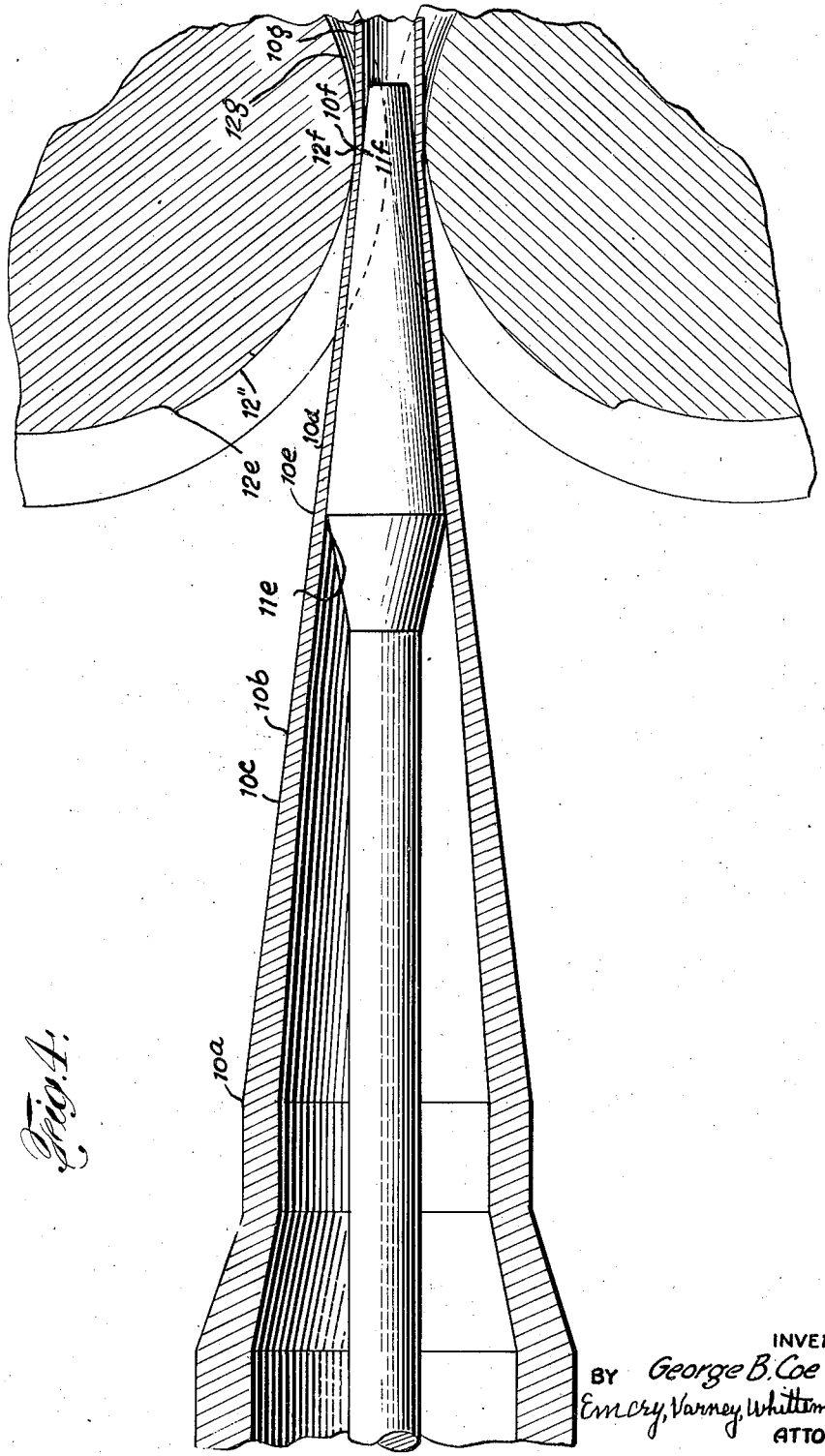
Fig. 4 is a similar diagram showing the starting stock after the action of the third set of dies has been completed.

At the end of operations by the first set of dies, as shown in Fig. 2, the large part 12a of the tapered groove of each rocker die registers with a point 10a of the tube which is the predetermined large end of the tapered portion of the tube; and these points 12a and 10a lie in a transverse plane which passes through the point 11a of the mandrel. The small end of the tapered portion of the tube at 10b similarly coincides with the point 11b of the mandrel and the point 12b at the small end of the tapered portion of the groove of each rocker die of the set.

It will be seen that in addition to the tapered portion 10a—10b of the tube there has also been formed a straight or cylindrical portion which begins at the small point 11b and extends forward clear of the mandrel. The dies may be formed with straight or cylindrical portions to smooth this straight section of the tube in the manner later described for another set, but, inasmuch as the feed is quite small and the tube is left fairly smooth by the tapered portion of the dies, the straight portion is for simplicity omitted.

The mandrel might have a corresponding straight (concentric) portion, but it is not indispensable, hence is omitted. A single mandrel may therefore be used for all actions. When a given number of tubes have been given a reduction by the first set of dies, the large portion of the mandrel may be relieved, as by turning or grinding, to permit the tube to be slipped back for the next reducing action. It is not necessary to reduce the mandrel precisely to the point 11b for the reason that there is a slight clearance between tube and mandrel after reduction, and it is sufficient to reduce the mandrel to some higher point 11c. If, for example, the length 11a—11b is 18¾", the allowance or overlap 11c—11b may be 1". This permits the succeeding dies to smooth the small part of the previous tapered portion and blend one tapered portion into another.

Instead of starting with a single long tapered mandrel and reducing the size of the large end in successive stages, it may be more satisfactory to provide separate mandrels for the several die sets. In either case, each die set begins its action upon the tube as its end enters over the large end or shoulder of the mandrel and the mandrel shoulder is sufficiently small to permit the tube to be passed completely thereover.

After the action of the first set of dies has been completed, the tube has a tapered portion and a straight or cylindrical portion of reduced diameter. The tapered portion is in its final form, except that there may be a small overlapping action on the small end, but the straight or cylindrical portion is to receive further operations. The tube is now placed upon the relieved mandrel with its forward end extended just over the new shouldered point 11c and is fed in increments along the mandrel as it is reduced in increments of length by a second set of dies 12'. The tube is reduced upon the tapered portion 11c—11d of the mandrel 11 beneath the tapered portion 12c—12d of the dies 12' and, when the action is completed, the tube has a tapered portion 10c—10d and a straight or cylindrical portion beyond the point 10d which emerges from the mandrel at the point 11d. The reducing operation is stopped practically as soon as the small end of the first or large tapered portion 10a—10b of the tube is reached, the small overlap 10c—10b being just sufficient to cause the large end of the second tapered portion 10c—10d to blend smoothly into the first tapered portion.

Similarly the third set of dies 12" reduces the small straight or cylindrical portion of the tube beyond the second tapered portion to form a third tapered portion 10e—10f and a small straight portion therebeyond. The corresponding tapered portion of the mandrel is designated as 11e—11f and of the dies as 12e—12f.

The tube may be further reduced by further die sets but the final set of dies is preferably provided with a straight (concentric) portion 12f—12g for smoothing the final straight portion of the tube which emerges from the mandrel at the point 11f. The mandrel is extended beyond the point 11f and preferably this extension forms a continuation of the last tapered portion.

At each stage a mandrel with a reduced shoulder is provided and also a new set of dies to fit the new taper of the mandrel. Thus the die sets will be of successively decreasing size, that is to say, while their tapered grooves may be, as shown in the drawings, of substantially the same length, the depths of the grooves will progressively decrease with each succeeding set. Hence, with rolls or rockers of any given diameter, large or small, a uniformly tapered tube of any desired length may be formed from a cylindrical tube by using a sufficient number of these die-sets in the manner aforesaid. When used in that manner, the action of each die-set reduces the tube in increments, beginning in each case at the forward end of the tube, by rolling it step by step toward that end and working backward therefrom along the tube to a predetermined point where the action is stopped, the point where the action is stopped in the case of each succeeding die-set being nearer the forward end of the tube than in the case of the immediately preceding die-set.

The dies have a very favorable action upon the metal and can effect very great reduction without annealing, but if for any reason it is desired to anneal between some or all of the reducing stages, this is done under conditions which will preserve the polished surfaces of the stock. For example, steel tubes may be annealed in a hydrogen atmosphere. For various metals the atmosphere and other conditions which are employed will be suited to the kind of metal (or alloy) being treated.

After the final stage of reduction the end or ends of the tube may be cut off to eliminate so much of the straight or cylindrical portions as are not wanted. As a practical matter, the dimensions and reductions are calculated in advance to avoid all or almost all waste of material and processing.

While one embodiment of the invention has been described to illustrate the principles of the invention, the invention itself is not so limited but may have various embodiments within the limits of the prior art and the scope of the subjoined claims.

I claim as my invention:

1. The method of making long tapered stock from cylindrical stock which comprises, reducing the cylindrical starting stock in successive short increments of length by rolling it step by step toward the end thereof at which the reduction is begun and working backward from that end to predetermined points along the stock respectively by a plurality of tapered die sets of successively decreasing size, the point to which the working is carried by each succeeding die set being nearer the end of the stock where the reduction was begun than in the case of the preceding die set whereby the stock is formed into successive tapered portions which become progressively smaller as they approach that end of the stock.

2. The method of making tapered tubes from cylindrical tubular stock which comprises, reducing the stock in successive short increments of length by rolling it step by step down the taper of a mandrel and toward the end of the stock at which the reduction is begun and working backward from that end to predetermined points along the stock respectively by a plurality of tapered die sets of successively decreasing size, the initial die set forming first a reduced cylindrical portion and then a tapered portion, and each succeeding die set forming, from the preceding reduced cylindrical portion, first a further reduced cylindrical portion and then a tapered portion smaller than the preceding tapered portion and adjacent to it.

3. The method of making tapered tubes from cylindrical tubular stock which comprises, reducing the stock in successive short increments of length by rolling it step by step toward the end of the stock at which the reduction is begun and working backward from that end to predetermined points along the stock respectively by a plurality of tapered die sets of successively decreasing size, the point to which the working is carried by each succeeding die set being nearer the end of the stock where the reduction was begun than in the case of the preceding die set whereby the stock is formed into successive tapered portions which become progressively smaller as they approach that end of the stock.

4. The method of rolling out tapered tubes from cylindrical tubular stock by a plurality of die sets of successively decreasing size which comprises, reducing the stock in successive short increments of length by rolling it with the first die set step by step toward the end of the stock at which the reduction is begun and working backward from that end to a predetermined point along the stock thereby forming first a reduced cylindrical portion and then a tapered portion, similarly reducing the aforesaid cylindrical portion with the next die set by working backward from the same end of the stock to a point slightly overlapping the small end of the preceding tapered portion, and proceeding in the same manner with each succeeding die set to reduce the cylindrical portion produced by the preceding die set, whereby the stock is formed into a plurality of successively smaller tapered portions each blending into the immediately preceding tapered portion to produce a tube tapering uniformly toward the end of the stock at which the reduction was begun.

5. The method of rolling out a tapered tube from a cylindrical tube which comprises, reducing the cylindrical tube in successive short increments of length by rolling it downward step by step from the large end or shoulder of a tapered mandrel toward the end of the tube at which the reduction is begun and while the tube is fed forward in steps along the mandrel, and working backward in a plurality of stages from that end of the tube to successive predetermined points on the tube by a plurality of tapered die sets of successively decreasing size and with a corresponding number of mandrel elements of decreasing size, each preceding die set forming firstly a reduced cylindrical portion emerging from the taper of the mandrel and lastly a tapered portion upon the mandrel, and each succeeding die set forming from the preceding reduced cylindrical portion a smaller tapered portion which is disposed forward of the preceding larger tapered portion.

6. The method of rolling a cylindrical tube into a tapered tube of any desired length by rolls or rockers of any given diameter provided respectively with die sets having tapered grooves of substantially uniform length but of successively decreasing depths, which method comprises, submitting the tube to the reducing action of each die set consecutively by rolling it with each die set in small increments step by step toward the end of the tube where the reducing action is begun with the first die set and working backward from that end along the tube, stopping the reducing action of the first die set at a predetermined point, and stopping the reducing actions of the succeeding die sets respectively at predetermined points each of which is nearer the aforesaid end of the tube than the point at which the action of the immediately preceding die set was stopped.

GEORGE B. COE.

CERTIFICATE OF CORRECTION.

Patent No. 2,349,246. May 23, 1944.

GEORGE B. COE.

It is hereby certified that error appears in the printed specification of the above numbered patent requiring correction as follows: Page 1, first column, line 45, for "companion" read --comparison--; line 54, after "straight" insert the words "or cylindrical--; page 2, second column, line 41, for "reduction" read --reductions--; and that the said Letters Patent should be read with this correction therein that the same may conform to the record of the case in the Patent Office.

Signed and sealed this 1st day of August, A. D. 1944.

Leslie Frazer

(Seal) Acting Commissioner of Patents.